United States Patent
O'Mathuna et al.

(10) Patent No.: US 8,716,647 B2
(45) Date of Patent: May 6, 2014

(54) ANALOG SILICON PHOTOMULTIPLIER USING PHASE DETECTION

(75) Inventors: Padraig O'Mathuna, San Jose, CA (US); Yong Luo, Cupertino, CA (US)

(73) Assignee: NXP, B.V., Endhoven (NL)

( * ) Notice: Subject to any disclaimer, the term of this patent is extended or adjusted under 35 U.S.C. 154(b) by 363 days.

(21) Appl. No.: 13/127,786

(22) PCT Filed: Nov. 6, 2009

(86) PCT No.: PCT/IB2009/054949
§ 371 (c)(1),
(2), (4) Date: Aug. 4, 2011

(87) PCT Pub. No.: WO2010/052674
PCT Pub. Date: May 14, 2010

(65) Prior Publication Data
US 2011/0315856 A1 Dec. 29, 2011

Related U.S. Application Data

(60) Provisional application No. 61/198,668, filed on Nov. 7, 2008.

(51) Int. Cl.
*H01L 31/00* (2006.01)
(52) U.S. Cl.
USPC ............... 250/214.1; 250/208.2; 257/431; 327/326; 327/514; 327/584
(58) Field of Classification Search
USPC ...... 250/208.1, 208.2, 214.1, 214 R, 214 DC; 398/189, 196, 206, 210; 327/514, 326, 327/584, 535; 257/431
See application file for complete search history.

(56) References Cited

U.S. PATENT DOCUMENTS

| 5,591,962 | A  | * | 1/1997 | Koishi et al. | 250/214.1 |
| 7,705,284 | B2 | * | 4/2010 | Inoue et al. | 250/214 R |
| 8,405,019 | B2 | * | 3/2013 | Nishioka | 250/214 R |
| 2011/0108712 | A1 | * | 5/2011 | Thomas et al. | 250/214 R |
| 2012/0063789 | A1 | * | 3/2012 | Yuan et al. | 398/202 |

FOREIGN PATENT DOCUMENTS

WO 2006/111883 A2 10/2006

OTHER PUBLICATIONS

Mann, Alexander, et al. "A Sampling ADC Data Acquisition System for Positron Emission Tomography", IEEE Nuclear Science Symposium Conference Record, Rome, IT; 5 Pages (2004).
Stewart, A. G., et al. "Study of the Properties of New SPM Detectors", Semicondcutor Photodetectors III—San Jose, CA, US, vol. 6119, 61190A, 10 Pages (Jun. 2006).
International Search Report and Written Opinion for Intl Application PCT/IB2009/054949 (Aug. 18, 2010).

\* cited by examiner

*Primary Examiner* — Francis M Legasse, Jr.

(57) ABSTRACT

An analog silicon photomultiplier system includes at least one analog pixel comprising a plurality of analog photodiodes (APDs), and a capacitor, a signal generator, a phase detector, and a compensation network. The signal generator is configured to generate and propagate a sinusoidal signal concurrently along first and second transmission lines. A capacitor is loaded on the first transmission line when an APD corresponding to the capacitor detects a photon. The phase detector is coupled with the first and second transmission lines, determines a phase difference between the first transmission line and the second transmission line and calculates a number of APDs that have fired from the phase difference. The compensation network is coupled with the second transmission line and the phase detector, and comprises a plurality of compensation capacitors, wherein the compensation capacitors are loaded on the second transmission line in proportion to the number of APDs that have fired.

14 Claims, 4 Drawing Sheets

ANALOG SILICON PHOTOMULTIPLIER USING PHASE DETECTION

The present invention relates to an analog silicon photomultiplier using phase detection.

Silicon photomultipliers (SiPMs) have been proposed as components in a number of systems, including as a photodetector for positron emission topography (PET) systems. An SiPM consists of a number of small avalanche photodiode cells driven in a limited Geiger mode (e.g., Geiger-mode avalanche photodiode, or GM-APD) and connected in parallel. SiPMs offer not only excellent timing resolution but also single photon detection capability. However, several issues such as sensitivity to blue light, the dark count rate and the yield in manufacturing have slowed the adoption of SiPMs as a solution for various systems, since these issues, along with other issues, result in high prices.

SiPMs are intrinsically fast due to a very small width of depletion layer and an extremely short time of Geiger-type discharge development (less than 500 ps, in some cases). Moreover, after Geiger discharge, each pixel is recovered with a typical time of order $C_{pixel} \times R_{pixel} \cong 30$ ns. In some cases, a single pixel recovery time of 10-15 ns can be achieved.

Although the mode of operation of each GM-APD cell (e.g., each pixel cell) in an SiPM is digital, the output of the SiPM device has generally been the analog sum of the currents through all of the GM-APD cells. In any given SiPM, there will be several GM-APDs in a pixel that are not working due to processing problems. This can result in a GM-APD always turned off or turned on. If the GM-APD is always turned on, it will always source a current to the system regardless of the photon activity. Accordingly, additional analog processing may be required before the subsequent digital post processing to screen out the GM-APDs that are always turned off or turned on (e.g., malfunctioning GM-APDs).

Exemplary embodiments according to the present invention provide an analog SiPM using phase detection. Measuring the SiPM's timing and energy resolution from the analog current domain to the analog frequency domain provides additional analog processing that may be utilized to screen out GM-APDs that are always turned off or turned on. In addition, the number of defective GM-APDs may be detected before any digital post-processing is performed, which offers a speed advantage not found in devices that depend on digital post-processing.

According to an exemplary embodiment of the present invention, there is provided an analog SiPM system configured to detect low-energy photon emissions, wherein the system includes at least one analog pixel comprising a plurality of analog photodiodes (APDs) and a capacitor, the APDs configured to fire upon detection of a photon, a signal generator configured to generate and propagate a sinusoidal signal concurrently along a first transmission line and a second transmission line, wherein the capacitor is configured to be loaded on the first transmission line when an APD of the plurality of APDs in the at least one analog pixel corresponding to the capacitor detects a photon, a phase detector coupled with the first transmission line and the second transmission line, the phase detector configured to determine a phase difference between the first transmission line and the second transmission line and calculate a number of APDs that have fired from the phase difference, and a compensation network coupled with the second transmission line and the phase detector, the compensation network comprising a plurality of compensation capacitors, wherein the compensation capacitors are configured to be loaded on the second transmission line in proportion to the number of APDs that have fired.

The compensation network may determine the number of APDs that have fired.

The plurality of APDs may be configured to be driven in Geiger mode.

According to another exemplary embodiment of the present invention, there is provided a method of determining the number of photons detected in a pixel array, wherein the pixel array includes a plurality of analog pixels, each of the analog pixels comprising a plurality of avalanche photodiodes (APDs) and a capacitor, wherein the method generates a signal to be propagated approximately concurrently along a first transmission line and a second transmission line, wherein the plurality of analog pixels is coupled to the first transmission line, detects at least one photon with the pixel array, wherein each of the APDs is configured to fire upon detecting the at least one photon, turns on a switch when at least one of the APDs has fired for each of the analog pixels, wherein the capacitor is loaded on the first transmission line when the switch is turned on, and determines a phase difference between the first transmission line and the second transmission line, wherein the phase difference indicates the number of photons detected by the pixel array.

According to yet another embodiment in accordance with the present invention, there is provided a method of compensating for non-responsive avalanche photodiodes (APDs) in an analog pixel of a pixel array, the analog pixel comprising a plurality of APDs and a capacitor, wherein the method generates a signal to be propagated approximately concurrently along a first transmission line and a second transmission line, wherein the analog pixel is coupled to the first transmission line, detects at least one photon with the analog pixel, wherein each of the APDs of the analog pixel is configured to fire upon detecting the at least one photon, turns on a switch when at least one of the APDs has fired, wherein the capacitor is loaded on the first transmission line when the switch is turned on, determines a phase difference between the first transmission line and the second transmission line, and loads at least one compensation capacitor on the second transmission line to equalize the phase difference between the first transmission line and the second transmission line.

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

The present invention will now be described more fully with reference to the accompanying drawings, in which exemplary embodiments thereof are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Accordingly, there is provided an analog SiPM using phase detection. Measuring the SiPM's timing and energy resolution from the analog current domain to the analog frequency domain provides additional analog processing that may be utilized to screen out GM-APDs that are always turned off or turned on. In addition, the number of defective GM-APDs may be detected before any digital post-processing is performed, which offers a speed advantage not found in devices that depend on digital post-processing.

Figure 1:
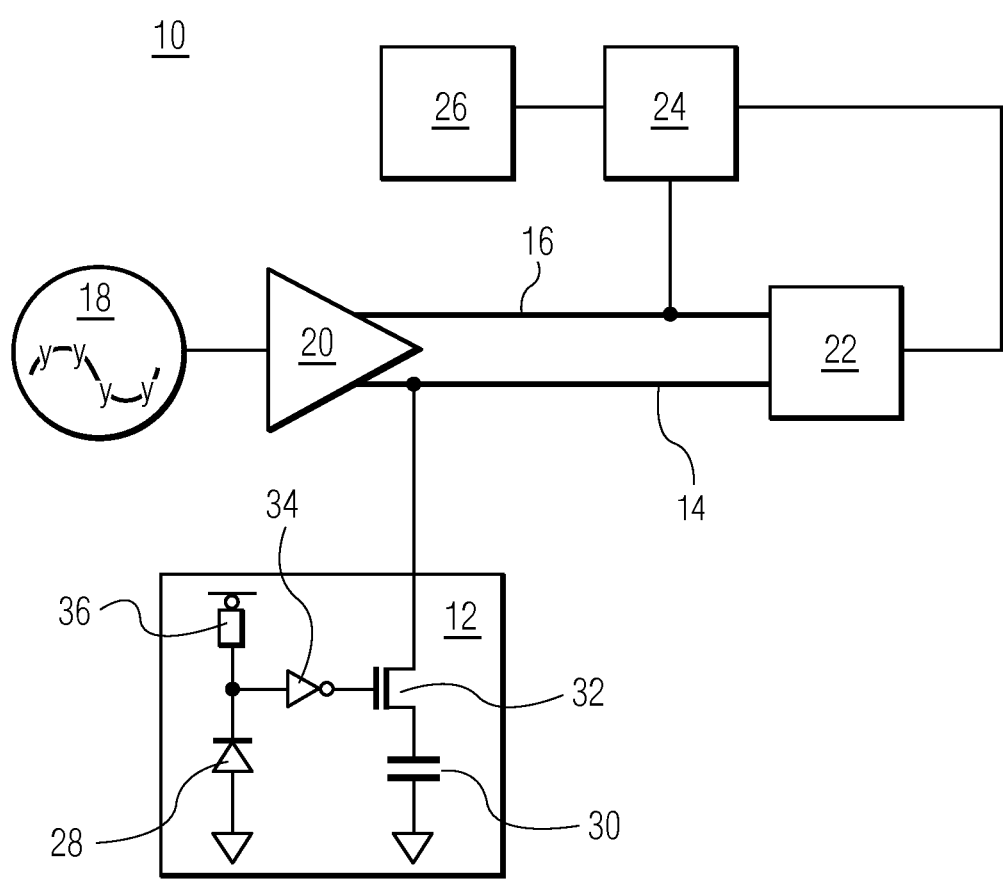
FIG. 1 is a system block diagram of an exemplary embodiment in accordance with the present invention.

FIG. 1 is a system block diagram of an exemplary embodiment in accordance with the present invention.

Referring to FIG. 1, an analog SiPM system 10 includes an analog pixel 12, a first transmission line 14, a second transmission line 16, a signal generator 18, a differential broadband amplifier 20, a phase detector 22, a compensation network 24 and a timer 26.

Figure 2:
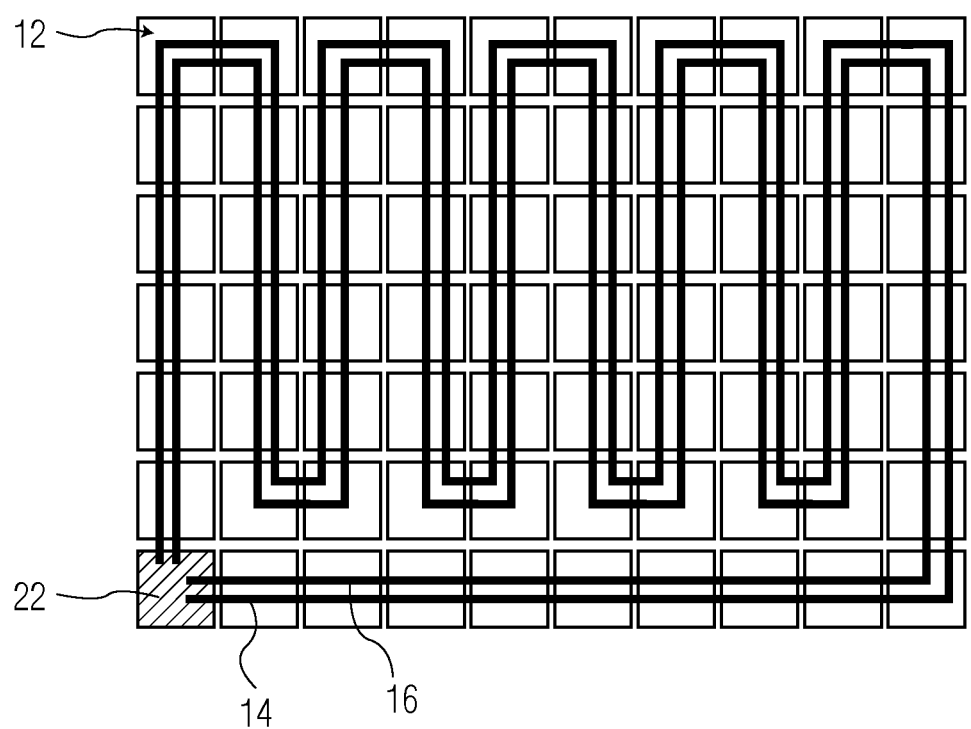
FIG. 2 is a pixel array in accordance with an exemplary embodiment of the present invention.

The analog pixel 12 includes at least one APD 28, a capacitor 30, a switch 32, an inverter 34, and a quenching resistor 36. The analog pixel 12 is coupled to the first transmission line 14 through the switch 32. One of ordinary skill in the art would recognize that multiple APDs 28 may be coupled to the first transmission line 14, in an array format (e.g., arranged in a grid format). FIG. 2 illustrates this concept.

The first transmission line 14 and the second transmission line 16 are configured such that a signal propagated simultaneously on the first transmission line 14 and the second transmission line 16 by the signal generator 18 reach the phase detector 22 at the same time and in the same phase. For example, the signal is a sinusoidal signal. Accordingly, if a delay is introduced into either the first transmission line 14 or the second transmission line 16, the phase detector 22 is configured to measure such a phase difference resulting from the delay.

The signal generator 18 is configured to generate a sinusoidal signal to be propagated approximately simultaneously on the transmission line 14 and the second transmission line 16. The differential broadband amplifier 20 is configured to propagate a sinusoidal signal approximately simultaneously on the transmission line 14 and the second transmission line 16.

The phase detector 22 detects the phase difference between the signal propagated along the first transmission line 14 and the second transmission line 16. The phase detector 22 is coupled to the compensation network 24 and provides the compensation network 24 with a signal (e.g., a linear voltage) corresponding to the detected phase difference. The compensation network 24 is thereby configured to switch in a number of compensation capacitors (internal to the compensation network 24) corresponding to the number of analog pixels in which an APD 28 has fired. If at least one APD 28 has fired in the analog pixel 12, the capacitor 30 is switched onto the first transmission line 14, causing the sinusoidal signal propagated along the first transmission line 14 to be delayed due to the additional capacitance. This will cause a phase mismatch between the signals transmitted along transmission lines 14 and 16. The phase detector 22 will measure this phase difference and signal the compensation network 24 to switch in the requisite number of compensation capacitors to delay the sinusoidal signal propagated along the second transmission line 16. The net effect of the delay to the sinusoidal signal propagated along the second transmission line 16 is to equalize the phase difference detected by the phase detector 22, or in other words, to compensate for the delay introduced to the sinusoidal signal by the capacitor 30 when switched onto the first transmission line 14. The phase difference outputted by the phase detector 22 also serves to provide a number of photons that have been detected.

The timer 26 is configured to provide an accurate time that the APD 28 fired. The accurate time provided by the timer 26 is useful in determining where any given photon originated from in a Time-of-Flight (TOF) PET system for example. In general, PET systems image the body using two coincident 511 keV gamma photons that are detected by means of scintillation crystals. The scintillator crystals stop the gamma photon and convert part of its energy into several optical photons with energies in the blue part of the spectrum. This phenomenon is referred to as a gamma photon hit. The optical photons may subsequently be detected by one or more SiPM's in the PET system. Typically, nanosecond timing resolution is sufficient for the system to detect coincident hits, i.e. hits that are associated with the same positron decay event. However, if the timing resolution is improved to below a nanosecond (e.g., the timer 26 is configured to record sub-nanosecond time), localization of the particular positron decay event along the line of response defined by the two gamma hits and the additional timing resolution may be utilized to improve the overall quality of the PET image by reducing the signal to noise ratio.

FIG. 2 is a pixel array in accordance with an exemplary embodiment of the present invention.

Referring to FIG. 2, a pixel array 38 includes a number of the analog pixels 12 arranged in an array format, the first transmission line 14, the second transmission line 16 and the phase detector 22. The first transmission line 14 and the second transmission line 16 are coupled to each of the analog pixels 12, allowing the detector to measure the phase difference for multiple analog pixels 12. The phase difference may also be converted into a voltage and provided as feedback to control the status of each of the analog pixels 12.

Figure 3:
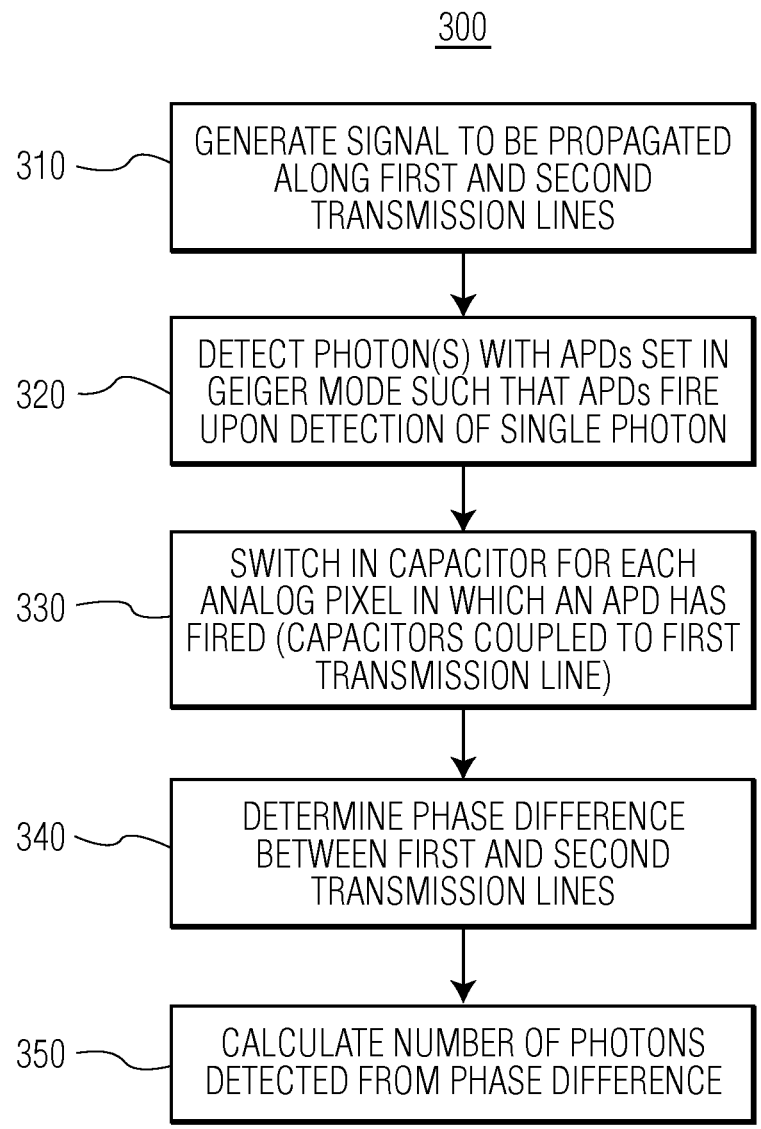
FIG. 3 is a flow diagram of an exemplary embodiment in accordance with the present invention.

FIG. 3 is a flow diagram of an exemplary embodiment in accordance with the present invention.

Referring to FIG. 3, at Block 310, a signal to be propagated along a first transmission line and a second transmission line is generated. The signal, for example, is a sinusoidal signal.

At Block 320, photon(s) are detected by utilizing APDs set in Geiger-mode (e.g., GM-APDs). The APDs set in Geiger-mode are configured such that the APDs fire upon detection of a single photon. APDs set in Geiger-mode are intrinsically fast due to a very small width of depletion layer and an extremely short time of Geiger-type discharge development (less than 500 ps, in some cases).

At Block 330, a capacitor is loaded on the first transmission line for each analog pixel in which an APD has fired. Each capacitor that is loaded on the first transmission line introduces a delay in the sinusoidal signal propagated along the first transmission line.

At Block 340, a phase difference between the first transmission line and the second transmission line is determined. The phase difference will vary depending on how many capacitors have been loaded on the first transmission line.

At Block 350, a number of photons detected is calculated from the phase difference. For each capacitor loaded on the first transmission line, the phase difference will increment, therefore enabling a simple algorithm to identify and calculate the number of photons detected.

The analog SiPM detector system provides a simplified numerical indicator for the number of photons detected for time-of-flight positron emission tomography (PET) systems. Rather than limiting the acquisition and readout phase to post-process implementation in the digital domain, the system may continually allocate and read out information such as the number of photons detected while in operation. This is because the phase difference due to the APD firing will be rapidly accounted for by the compensation network 24, in turn enabling the analog SiPM detector system to immediately become operational once the phase delay has been compensated for. This has the added benefit of virtually hiding the dead time experienced in some systems implementations, due to the 10-15 ns recovery time of a APD, and providing virtually continuous operation of the analog SiPM detector system.

Figure 4:
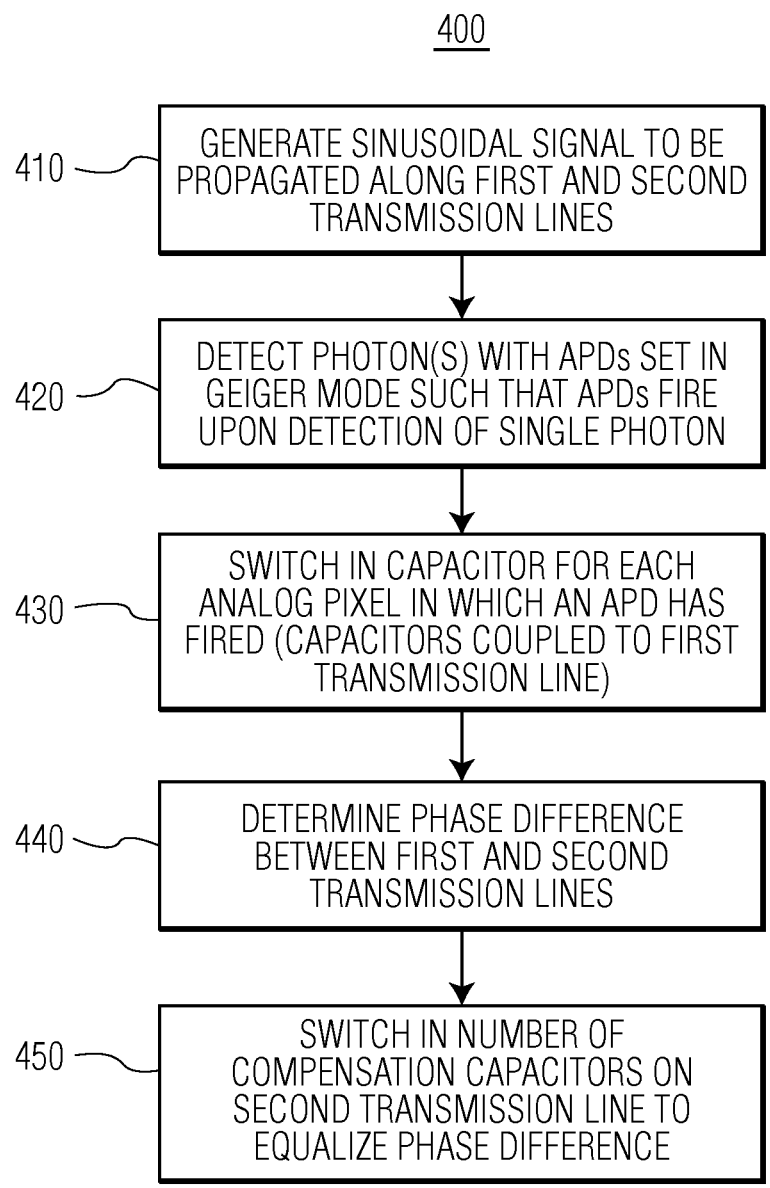
FIG. 4 is another flow diagram of an exemplary embodiment in accordance with the present invention.

FIG. 4 is another flow diagram of an exemplary embodiment in accordance with the present invention.

Referring to FIG. 4, Blocks 410 through 440 are the same or similar as Blocks 310 through 340 of FIG. 3. Block 430 is written from the perspective of one analog pixel of a pixel array. However, one of ordinary skill in the art would recognize that FIG. 4 may be extrapolated to include multiple analog pixels. At Block 450, a number of compensation capacitors are loaded on the second transmission line to equalize the phase difference determined in Block 440. Equalizing the phase difference provides a simplified method to minimize dark time (e.g., recovery time of each analog pixel) since the junction capacitance is more quickly discharged to a steady (e.g., equalized) level. These shorter recovery times may lead to higher sensitivity (e.g., more photon counts possible during the integration phase of the system) and higher dynamic range and/or better energy resolution of the detector. In addition, the phase difference also indicates the number of APDs that are erroneously turned off or turned on, essentially providing a periodic snapshot of the number of working APDs. The phase difference is proportional to the number of APDs 12 that have fired. By way of example, if there are "n" broken APDs 12 that are continually firing and no "good" APDs 12 firing, there will be "n" capacitors switched onto transmission line 14 by the broken APDs 12. The phase detector 22 will measure the phase mismatch and cause the compensation network 24 to switch "n" compensation capacitors onto the transmission line 16 to eliminate the phase mismatch seen by the phase detector 22. Accordingly, a baseline case of "n" capacitors have been switched in. Subsequently, if a number of photons hit the analog photomultiplier 38, "m" APDs 12 will fire and switch their associated capacitors 20 onto the transmission line 14. The phase detector 22 will once more detect a phase mismatch between transmission line 14 and transmission line 16. Consequently, the compensation network will switch "m" more capacitors onto the transmission line 16 to bring the phases back into alignment. The compensation network will now identify "n+m" compensation capacitors on transmission line 16. The baseline case, "n", may be subtracted from the "n+m" case to get "m", the number of APDs 12 that have fired. Over time (10-15 ns), the APDs 12 will restore, stop firing, and remove their capacitors 20 from transmission line 14. The phase detector 20 will detect this as a phase mismatch and cause the compensation network to restore the number of switched capacitors back to "n" to bring the phase back into alignment.

Accordingly, there is provided an analog SiPM using phase detection. Measuring the SiPM's timing and energy resolution from the analog current domain to the analog frequency domain provides additional analog processing that may be utilized to screen out GM-APDs that are always turned off or turned on. In addition, the number of defective GM-APDs may be detected before any digital post-processing is performed, which offers a speed advantage not found in devices that depend on digital post-processing.

The invention claimed is:

1. An analog silicon photomultiplier system configured to detect low-energy photon emissions, the system comprising:
   at least one analog pixel comprising a plurality of avalanche photodiodes (APDs) and a capacitor, the APDs configured to fire upon detection of a photon;
   a signal generator configured to generate and propagate a sinusoidal signal concurrently along a first transmission line and a second transmission line, wherein the capacitor is configured to be loaded on the first transmission line when an APD of the plurality of APDs in the at least one analog pixel corresponding to the capacitor detects a photon;
   a phase detector coupled with the first transmission line and the second transmission line, the phase detector configured to determine a phase difference between the first transmission line and the second transmission line and calculate a number of APDs that have fired from the phase difference; and
   a compensation network coupled with the second transmission line and the phase detector, the compensation network comprising a plurality of compensation capacitors, wherein the compensation capacitors are configured to be loaded on the second transmission line in proportion to the number of APDs that have fired.

2. The analog silicon photomultiplier system of claim 1, wherein the compensation network determines the number of APDs that have fired.

3. The analog silicon photomultiplier system of claim 1, the system further comprising:
   a timer coupled to the phase detector configured to record a time for each time the number of APDs has fired.

4. The analog silicon photomultiplier system of claim 3, wherein the timer is configured to record sub-nanosecond time.

5. The analog silicon photomultiplier system of claim 1, wherein the plurality of APDs are configured to be driven in Geiger mode.

6. The analog silicon photomultiplier system of claim 1, wherein the phase detector outputs a voltage corresponding to the phase difference to the compensation network.

7. The analog silicon photomultiplier system of claim 1, wherein the plurality of APDs further comprises an array of APDs arranged in a grid.

8. A method of determining a number of photons detected in a pixel array, wherein the pixel array includes a plurality of analog pixels, each of the analog pixels comprising a plurality of avalanche photodiodes (APDs) and a capacitor, the method comprising:
   generating a signal to be propagated concurrently along a first transmission line and a second transmission line, wherein the plurality of analog pixels is coupled to the first transmission line;
   detecting at least one photon with the pixel array, wherein each of the APDs is configured to fire upon detecting the at least one photon;
   turning on a switch when at least one of the APDs has fired for each of the analog pixels, wherein the capacitor is loaded on the first transmission line when the switch is turned on; and
   determining a phase difference between the first transmission line and the second transmission line, wherein the phase difference indicates the number of photons detected by the pixel array.

9. The method of claim 8 comprising:
   recording a time that each APD of the plurality of APDs has fired.

10. The method of claim 9, wherein the time that each APD of the plurality of APDs has fired is recorded to sub-nanosecond time.

11. The method of claim 8, wherein the plurality of APDs are configured to be driven in Geiger mode.

12. The method of claim 8, wherein the phase difference is converted into a linear voltage to indicate the number of photons detected by the pixel array.

13. A method of compensating for non-responsive avalanche photodiodes (APDs) in an analog pixel of a pixel array, the analog pixel comprising a plurality of APDs and a capacitor, the method comprising:
  generating a signal to be propagated approximately concurrently along a first transmission line and a second transmission line, wherein the analog pixel is coupled to the first transmission line;
  detecting at least one photon with the analog pixel, wherein each of the APDs of the analog pixel is configured to fire upon detecting the at least one photon;
  turning on a switch when at least one of the APDs has fired, wherein the capacitor is loaded on the first transmission line when the switch is turned on;
  determining a phase difference between the first transmission line and the second transmission line; and
  loading at least one compensation capacitor on the second transmission line to equalize the phase difference between the first transmission line and the second transmission line.

14. The method of claim 12, wherein the plurality of APDs are configured to be driven in Geiger mode.

* * * * *